United States Patent [19]
Durand et al.

[11] Patent Number: 5,736,482
[45] Date of Patent: Apr. 7, 1998

[54] CATALYSTS FOR REDUCING NITROGEN OXIDES TO MOLECULAR NITROGEN IN A SUPERSTOICHIOMETRIC MEDIUM OF OXIDIZING COMPOUNDS, PROCESS FOR PREPARATION, AND USES

[75] Inventors: Daniel Durand, Rueil Malmaison; Gil Mabilon, Carrieres sur Seine; Paul Mouchot, Lyons, all of France

[73] Assignee: Institut Francais du Petrole, Rueil-Malmaison, France

[21] Appl. No.: 598,828

[22] Filed: Feb. 5, 1996

[30] Foreign Application Priority Data

Feb. 3, 1995 [FR] France ..................... 95 01364

[51] Int. Cl.⁶ .................. B01J 23/00; B01J 8/00; B01J 23/02
[52] U.S. Cl. .................. 502/303; 502/304; 502/325; 502/306; 502/340; 423/239.1
[58] Field of Search .................. 502/302, 303, 502/304, 325, 330, 340, 313, 306; 423/239.1

[56] References Cited

U.S. PATENT DOCUMENTS

| | | | |
|---|---|---|---|
| 3,883,444 | 5/1975 | Maselli et al. | 252/455 R |
| 3,931,050 | 1/1976 | Asano et al. | 252/462 |
| 4,018,710 | 4/1977 | Oshimura et al. | 252/439 |
| 4,904,633 | 2/1990 | Ohata et al. | 502/304 |
| 5,179,059 | 1/1993 | Domesle et al. | 502/303 |

FOREIGN PATENT DOCUMENTS

| | | |
|---|---|---|
| 0 100 267 | 2/1984 | European Pat. Off. . |
| 0 441 173 | 8/1991 | European Pat. Off. . |
| 0 507 590 | 10/1992 | European Pat. Off. . |
| 0 613 714 | 9/1994 | European Pat. Off. . |
| 2 449 475 | 9/1980 | France . |
| 24 40 433 | 3/1975 | Germany . |

*Primary Examiner*—Glenn Caldarola
*Assistant Examiner*—Tanaga A. Boozer
*Attorney, Agent, or Firm*—Millen, White, Zelano, & Branigan, P.C.

[57] ABSTRACT

Described is catalyst that is active and selective for reducing to molecular nitrous oxides contained in a superstoichiometric medium of oxidizing agents, said reduction being conducted with agents such as carbon monoxide, hydrogen, hydrocarbons, alcohols, ethers, and other oxidized organic compounds and also with ordinary fuels such as gasolines, gas oils, liquefied gases, and compressed natural gases, whereby said catalyst comprises:

- at least one refractory inorganic oxide, including alumina;
- at least one element (A) that belongs to the group of rare earths;
- at least one element (B) that belongs to groups VIB, VIIB, VIII and IB of transition metals;
- at least one metal (C) that belongs to the group of precious metals of the platinum family, and optionally
- at least one element (D) that belongs to group IIA of alkaline-earths;
- at least a portion of elements (A) is combined with alumina to form at the surface of the latter a microlayer of rare-earth aluminate.

34 Claims, No Drawings

CATALYSTS FOR REDUCING NITROGEN OXIDES TO MOLECULAR NITROGEN IN A SUPERSTOICHIOMETRIC MEDIUM OF OXIDIZING COMPOUNDS, PROCESS FOR PREPARATION, AND USES

BACKGROUND OF THE INVENTION

This invention relates to catalysts that promote the elimination of nitrogen oxides (NO and $NO_2$, commonly called $NO_x$) that are present in a superstoichiometric gas mixture of oxidizing compounds, and more particularly of oxygen. These catalysts activate the reaction of reduction of these molecular nitrogen oxides ($N_2$) by limiting the formation of undesirable by-products such as nitrous oxide ($N_2O$).

These catalysts are particularly well suited for the conversion of nitrogen oxides that are present in the exhaust gases of stationary engines or of diesel automobile engines or controlled-ignition engines (so-called lean-control engines), but also in the gases that come from a gas turbine that runs on gas or liquid fuels.

These gases are characterized by nitrogen oxide contents of several tens to several thousands of parts per million (ppm), by contents that are comparable in terms of reducing compounds (CO, $H_2$, hydrocarbons), but primarily by large concentrations of oxygen (from 1 to close to 20% by volume).

The strong toxicity of nitrogen oxides and their role in the formation of acid rain and damaging of tropospheric ozone have led to the enactment of strict standards that limit the release of these compounds. To meet these standards, it is generally necessary to eliminate at least a portion of these oxides that are present in the exhaust gases of automobile engines or stationary engines and turbines.

The elimination of nitrogen oxides by thermal decomposition or preferably catalytic decomposition is conceivable, but the high temperatures that are required for this reaction are incompatible with those of exhaust gases. They can only be reduced using the present reducing agents, but in small quantities, in the exhaust gas (CO, $H_2$, hydrocarbons that are unburned or in which combustion has been incomplete in the engine), and also by injecting, upstream from the catalyst, additional reducing compounds. These reducing agents are hydrocarbons, alcohols, ethers, or other oxidized compounds; they can also be the gas or liquid (pressurized "GNC" or liquefied "GPL") fuel that powers the engine or the turbine.

The reduction of nitrogen monoxide and nitrogen dioxide (NO and $NO_2$) can lead to, according to the equations mentioned below, the formation either of molecular nitrogen ($N_2$) or of nitrous oxide ($N_2O$).

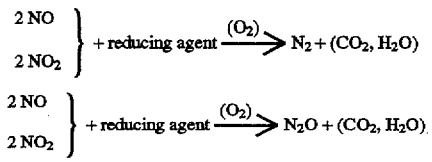

Molecular nitrogen ($N_2$) is the harmless product desired, whereas the formation of nitrous oxide ($N_2O$), a non-inert compound, should be avoided or at least limited as much as possible.

The essential parameters for characterizing the performance levels of the catalyst by eliminating nitrogen oxide are:

the temperature for which the reaction is maximized
the conversion (or degree of elimination) of $NO_x$
$N_2$ and $N_2O$ selectivities
and primarily the $N_2$ output of the reaction of reduction of $NO_x$ which can be expressed by the equation:

$$N_2 \text{ output} = 100 \times \frac{\text{lost } NO_x - 2 \times (\text{formed } N_2O)}{\text{initial } NO_x}$$

The catalytic phases that are claimed by the applicant achieve the reduction of nitrogen oxides with high conversion rates at temperatures that are much lower than those required with conventional catalysts that are prepared by exchange of transition metals, in particular copper, on zeolites. They also lead to nitrogen outputs that are superior to those obtained with catalysts that are prepared based on precious metals that are deposited on standard substrates (alumina, silica, etc.).

The majority of the work done on the development of active catalysts in the elimination of nitrogen oxides in an oxidizing medium relates to the use of transition metals (and more particularly copper) that are exchanged on zeolites with Si/Al atomic ratios that are generally between 3 and 100 and whose structures can be of different types (mordenite, faujasite, ZSM5, etc.). These catalysts are active in converting nitrogen oxides for temperatures that are between 350° and 550° C. These conditions therefore limit their use in abating the pollution produced by the exhaust gases from lean-control gasoline engines and heavy diesel truck engines when the latter operate at full load and high speed. The reduction of nitrogen oxides in these catalysts is very selective in molecular nitrogen (FR-A-2655565 and U.S. Pat. No. 5,149,511). Unfortunately, for light automobile diesels, the temperature of the exhaust gases is generally between 150° and 300° C. and rarely exceeds 500° C., which has the effect of reducing the efficiency of these catalysts in the elimination of nitrogen oxides under the normal conditions of use of the vehicle.

The use of precious metals as active phases also makes it possible to eliminate a large portion of nitrogen oxides (mainly NO) at ratios that are comparable to those that are measured with the copper catalysts. These catalysts also have the advantage of being active at temperatures that are considerably lower (200°–300° C.), which is an essential advantage for abating pollution from exhaust gases of diesel automobiles whose temperatures at the output of the engine are generally between 150° and 300° C.

The precious metals of the platinum family can be saturated on different substrates such as alumina, silica, zirconia, titanium oxide, or zeolites or else perovskites (EP-A-455491). They can also be introduced into a composite oxide (perovskites, for example), either by saturation on this substrate or by being added with the other materials that are used for building this mixed oxide (EP-A-525677).

The majority of these catalysts, however, exhibit the drawback of only partially achieving the reduction of $NO_x$, i.e., that the majority product is not molecular nitrogen ($N_2$) but nitrous oxide ($N_2O$).

Other catalysts that contain precious metals (generally platinum, palladium, and rhodium or mixtures thereof), alkaline-earths, and rare earths have been recommended for abating the pollution caused by the exhaust gases of an internal-combustion engine, including nitrogen oxides. In general, they are used within the framework of three-way catalysis, i.e., with gas compositions at stoichiometry or close to this equilibrium (JP-A-05/237384A—EP-A-507590—EP-A-199509). In these catalysts, the purpose of adding these alkaline-earth elements and of these rare earths is to improve the thermal stability of the catalyst and to increase its service life. Owing to its ability to evolve quickly between its two degrees of oxidation (+3 and +4), however, depending on the rich or poor composition of the reaction mixture, cerium takes part in the catalytic action (storage and reproduction of oxygen).

U.S. Pat. No. 4,849,398 describes a catalyst that makes it possible to widen the operating window and to improve the effect of storing oxygen when the exhaust gas becomes oxidizing. This catalyst is prepared by forming a perovskite (of $Ba_{1-x}La_xCeO_3$ type, with x from 0 to 1) on a substrate that is coated with alumina, then by saturation of the whole with precious metals.

For converting $NO_x$ to an oxidizing medium, a platinum-lanthanum catalyst deposited on a porous substrate makes it possible to eliminate the pollutants, including the $NO_x$ in an exhaust gas that contains excess oxygen (JP-A-05/168862). The document EP-A-562516 describes a catalyst with saturated platinum on an alumina substrate that contains lanthanum and barium which are partially combined to form a composite oxide.

Document JP-A-05/076762 describes a catalyst that contains precious metals, alkaline metals, transition metals and rare earths, where all these elements are part of the structure of a perovskite.

More complex catalytic systems are also proposed. For example, they can be formed by a group of two catalysts that are of different formulations and arranged in series: the first catalyst with a precious metal base would carry out the oxidation of NO to $NO_2$, and the second catalyst with a transition metal base on zeolite or rhodium would reduce this nitrogen dioxide to molecular nitrogen (JP-A-05/096132). Another proposed solution is to produce a multilayer catalyst where precious metals, rare earths, transition metals, and alkaline-earth metals are present but are distributed unequally on each layer (JP-A-04/083516).

SUMMARY OF THE INVENTION

An object of this invention is to propose catalysts whose effectiveness is comparable to, if not greater than, those of the formulations above, for the elimination of nitrogen oxides at low temperature in a strongly oxidizing gas mixture but which, in addition, make it possible to attain considerably improved outputs of molecular nitrogen. This improvement is obtained by lowering the selectivity of the reduction of the nitrogen oxides of nitrous oxide ($N_2O$) and consequently by increasing selectivity and $N_2$ output.

This invention relates to a catalyst that is able to eliminate the nitrogen oxides ($NO_x$) that are present in a superstoichiometric gas mixture made of oxygen by limiting as much as possible the undesired formation of nitrogen protoxide ($N_2O$). To carry out this reaction, at low temperature and with a high output of molecular nitrogen ($N_2$), the applicant proposes to partially modify the surface state of at least one conventional refractory oxide, including alumina, by adding at least one rare earth to form on the surface at least one rare earth aluminate. The applicant adds at least one transition metal and optionally one element that belongs to the group of alkaline-earths and optionally one element that belongs to the group of rare earths to this modified alumina. At least one element that belongs to the group of precious metals of the platinum family is introduced in the final phase of preparation.

These catalytic phases (or active phases) come in the form of either balls, extrudates, or pellets, or monolithic substrates on which the active phase (or catalytic phase) is coated or directly prepared.

Thus, the catalysts of the invention can be defined, in a general way, by the fact that they comprise:

- at least one refractory inorganic oxide that consists of at least one portion of alumina;
- at least one element (A) that belongs to the group of rare earths;
- at least one element (B) that belongs to groups VIB, VIIB, VIII and IB of transition metals;
- at least one element (C) that belongs to the group of precious metals that comprises platinum, rhodium, ruthenium, iridium, and osmium;
- and optionally at least one element (D) that belongs to group IIA of alkaline-earths;
- at least one portion of elements (A) being combined with a portion of alumina to form on the surface of the latter a microlayer of rare earth aluminate.

More particularly, the composition per unit of mass of the active phase, expressed in percent by weight relative to the total weight of said active phase that is calcined at 1000° C. for 4 hours, is as follows:

from 30 to 98.45% of at least one refractory inorganic oxide, including alumina, from 1 to 30% of at least one element (A) that belongs to the group of rare earths, expressed in oxide form, from 0.5 to 20% of at least one element (B) that belongs to groups VIB, VIIB, VIII and IB of transition metals, expressed in oxide form, from 0.05 to 5% of at least one metal (C) that belongs to the group of the above-mentioned precious metals, and from 0 to 15% of at least one element (D) that belongs to group IIA of alkaline-earths, expressed in oxide form.

Advantageously, the composition of the catalytic phase, still expressed relative to the product that is calcined at 1000° C., is:

from 52 to 93.9% of at least one refractory inorganic oxide, including alumina, from 5 to 20% of at least one element (A) that belongs to the group of rare earths, expressed in oxide form, from 1 to 15% of at least one element (B) that belongs to the group of transition metals, expressed in oxide form, from 0.1 to 3% of at least one metal (C) that belongs to the group of above-mentioned precious metals, and from 0 to 10% of at least one element (D) that belongs to group IIA of alkaline-earths, expressed in oxide form.

The refractory inorganic oxide is generally selected from the group formed by the compounds below: α-alumina, β-alumina, δ-alumina, γ-alumina, χ-alumina, θ-alumina. Other oxides such as silicas, silica-aluminas, zeolites, titanium oxide, zirconium oxide, and combinations thereof, mixed oxides or solid solutions that comprise at least two of the above-mentioned oxides can be added to these aluminas.

The applicant, however, prefers the β-, δ-, γ-, θ- and χ-aluminas or a mixture of at least two of these aluminas. Their content per unit of mass relative to the weight of the group of the refractory inorganic oxides that fall within the composition of the active phase of the catalyst is between 50 and 100%, and preferably between 80 and 100%.

Elements (A) of the group of rare earths that are preferred by the applicant are lanthanum, neodymium, praseodymium, samarium, and gadolinium or a mixture of at least two of these elements. Even so, the applicant prefers lanthanum.

Elements (B) that belong to the groups of transition metals VIB, VIIB, VIII and IB of the periodic table and that are selected by the applicant are copper, nickel, cobalt, iron, manganese, chromium and molybdenum, or a mixture of at least two of these elements. The applicant, however, prefers copper, nickel, cobalt, and manganese or a mixture of at least two of these metals.

Among above-mentioned precious metals (C), the applicant prefers to use platinum. It is also possible to use said precious metals in combination with palladium, for example at a ratio of up to 20% by weight, and preferably to 15% by weight, relative to the group of precious metals.

To further modify the acidity of the substrate, it is optionally possible to add at least one element (D) that belongs to group IIA of alkaline-earths. Among the latter, the applicant prefers calcium, barium, and strontium or a mixture of at least two of these elements.

For the catalyst to be more selective for the reduction of nitrogen oxides to molecular nitrogen, however, the atomic ratio between, on the one hand, the sum of the atoms of rare earths (A) and optionally atoms of alkaline-earth elements (D) and, on the other hand, the number of atoms of transition metals (B), is between 0.1 and 10 and preferably between 0.5 and 5.

The catalysts of the invention, which are active in selective reduction of nitrogen oxides to molecular nitrogen, come either in the form of balls, pellets, or extrudates or in monolithic form (active phase deposited on a ceramic or metal substrate.). In the first case, the unit stages of the preparation are as follows:

a) a stage of calcination under air of the refractory inorganic oxide at between 500° and 1100° C. so that the specific surface area of this oxide is between 10 and 150 $m^2/g$ and preferably between 20 and 100 $m^2/g$, b) a stage of saturation of this refractory inorganic oxide with at least a portion of at least one precursor salt of at least one rare earth oxide (A), c) a stage of drying and then calcination under air, of the inorganic oxide saturated with the precursors of rare earth oxides (A), at a temperature of between 700° and 1100° C. so that a surface microlayer of rare earth aluminate is created on the surface of the refractory inorganic oxide, d) a stage of saturation of this modified refractory oxide, with a solution that contains the remainder of at least one precursor salt of at least one rare earth oxide (A) and at least one precursor salt of at least one element of the group of transition metals (B), e) a stage of drying and calcination under air of the refractory oxide that is modified and saturated with a transition metal precursor, at a temperature of between 650° and 900° C., for example so that the formation of a composite oxide of perovskite type is not observed by x-ray diffraction, f) a stage of saturation on the product that comes from calcination stage (e) of at least one precursor compound of at least one precious metal (C), g) a last stage of drying and heat treatment under air, either with a neutral mixture or else in a slightly reducing medium, of the inorganic oxide that is modified and saturated with the precious metal precursor in stage (e), at a temperature of between 300° and 900° C. and preferably between 500° C. and 800° C., and h) the optional addition of an alkaline-earth element (D) can be done by saturation with at least one precursor of at least one element that belongs to group IIB of the periodic table at the same time, or before or after saturation stages (b) and (d). The applicant, however, prefers that this addition be done during saturation stage (d) of transition metal precursors (B).

The durations of the stages of calcination and heat treatment (a), (c), (e) and (g), without drying times, are between 1 hour and 50 hours and preferably between 1 hour and 10 hours.

The heat treatment of stage (g) can be carried out in a furnace that is heated with natural gas where the fuel (gas)-oxidant (air) mixture is adjusted so that the medium is slightly oxidizing or slightly reducing or else in stoichiometry (or under an inert gas atmosphere such as nitrogen if an electric furnace is used).

The packaging of the catalyst in the form of balls, extrudates, or pellets can be carried out at any stage of the preparation. The applicant, however, prefers that the shaping stage be carried out directly on the refractory inorganic oxide before any modification, or else after all the stages of saturation and calcination.

Elements (A, B, C and D) are added to the refractory inorganic oxide by saturation of aqueous or organic solutions of metal or oxide precursors of these elements, according to the techniques known to one skilled in the art, known as the dry or surplus techniques.

The precursors of rare earths (A) are generally nitrates. The contents per unit of mass of these elements, expressed in terms of oxides relative to the active phase, are between 1 and 30% and preferably between 5 and 20% by weight relative to the total weight of the final catalytic phase.

The precursors of transition metals (B) are selected from nitrates, acetates, and formates, in aqueous solutions, and acetylacetonates, which can be used in an organic medium. The content per unit of mass of transition metal (B), expressed relative to the weight of the active phase, is between 0.5 and 20% and preferably between 1 and 15% by weight relative to the total weight of the final catalytic phase.

The precursors of precious metals (C) are those conventionally used for the preparation of catalysts, in particular and when they exist, chlorides, equivalent acids of chlorides, chlorinated complexes, nitrates, amino complexes, acetylacetonates. By way of non-limiting examples, hexachloroplatinic acid, tetramine platinum chloride, dinitroso-diamino platinum, hexachloro-iridic acid, ruthenium trichloride, and pentamine ruthenium dichloride can be cited.

The content per unit of mass of precious metal (C) in the active phase is between 0.05 and 5% and preferably between 0.1 and 3% by weight relative to the total weight of the final catalytic phase.

The nitrates, formates and acetates of elements (D) of group IIA of the alkaline-earths are generally used. The content per unit of mass in these elements (D), expressed in the form of oxide in the active phase, is between 0 and 15% and preferably between 0 and 10% by weight relative to the total weight of the final catalytic phase.

For use on a vehicle, however, it is often preferable to use rigid substrates (monoliths) that exhibit a significant open porosity (greater than 70%) to limit the pressure drops that strong gas flows, particularly the high volumetric flow rates of exhaust gases, could produce. Actually, these pressure drops are detrimental to the proper operation of the engine and contribute to lowering the efficiency of an internal-combustion engine (gasoline or diesel). Furthermore, with the exhaust line being subjected to vibration as well as to significant mechanical and thermal shocks, catalysts in the form of balls, pellets, or extrudates may experience deterioration due either to attrition or fracturing.

Two techniques are used to prepare the catalysts of the invention on monolithic substrates made of ceramic or metal.

The first consists in depositing on the monolithic substrate, by the coating technique that is known to one skilled in the art, the catalytic phase that is prepared according to the operating mode described above (unit stages. (a) to (h)).

The second technique, which is preferred by the applicant, consists first of all in depositing the inorganic oxide on the monolithic substrate according to the coating technique that is described below, and then in linking all unit stages (a) to (h) described above, directly to the monolithic substrate that is covered with refractory oxide.

The coating technique consists in preparing an aqueous suspension that consists of a powder filler (refractory inorganic oxide or the catalytic phase prepared according to the process above) and a so-called bonding compound of mineral origin (alumina gel, silica sol, etc.) or organic origin (gum arabic, etc.), which makes it possible to attach this oxide to the substrate. The operation of depositing this oxide is carried out either by immersing the monolith in the suspension, or by circulating the suspension in the monolith or else by spraying this suspension on the monolith. After elimination of the excess suspension, the oxide film is attached to the substrate by drying and then calcining the whole at a temperature of generally between 300° and 1100° C., preferably between 500° and 1100° C., which corresponds to the conditions of stage (a) described above.

The monolithic substrates that can be used are:
  either made of ceramic, whose main elements can be alumina, zirconium, cordierite, mullite, silica, aluminosilicates, or a combination of several of these compounds,
  or made of silicon carbide and/or silicon nitride,
  or made of aluminum titanate
  or made of metal; they are then generally obtained from iron, chromium and aluminum alloy, optionally doped with nickel, cobalt, cerium, or yttrium. The best known are called FECRALLOY® or KANTHAL®.

The ceramic substrates have a honeycomb-type structure or come in the form of foam or fibers.

The metal substrates can be produced by winding corrugated strips or by stacking metal sheets that are also corrugated and that constitute a honeycomb structure with straight channels or with zig-zag channels that may or may not communicate with one another. They can also be produced from fibers or metal wires that are interlocked, woven, braided, or knitted.

For the metal substrates that contain aluminum in their composition, it is recommended that they be pretreated at high temperature (for example, between 700° and 1100° C.) to develop on the surface a microlayer of refractory aluminum. This surface microlayer, with porosity and specific surface area greater than those of the original metal, promotes the bonding of the active phase while protecting the remainder of the substrate from corrosion.

The amount of catalytic phase (or active phase) that is deposited or prepared directly on the ceramic or metal substrate (or substrate) is generally between 20 and 300 g per liter of said substrate and advantageously between 50 and 200 g per liter.

Examples 1 and 5 to 8 below illustrate the invention without limiting its scope. These examples describe only the direct preparation of catalysts on a monolithic substrate. These phases, however, can also be prepared in the form of balls, extrudates, or pellets. This shaping (tabletization, extrusion, or pelletizing) can be carried out in all the stages of the preparation described above. The same holds true as regards the coating of the active phase, partially or totally formed, on a monolithic substrate.

Examples 2 to 4 describe the preparation of catalysts according to the prior art.

By way of comparison, all these catalysts are tested (Examples 9 and 10) either in a micro-unit laboratory with a mixture of synthetic gas or on an engine bed with a real exhaust gas.

In the foregoing and in the following examples, all temperatures are set forth uncorrected in degrees Celsius; and, unless otherwise indicated, all parts and percentages are be weight.

The entire disclosure of all applications, patents and publications, cited above and below, and of corresponding French application No. 95/01364, filed Feb. 3, 1995, are hereby incorporated by reference.

EXAMPLES

In all the examples, the designation of the active phase (or catalytic phase) deposited on the substrate (or substrate) corresponds to the sum of the elements that contain the catalyst described in the procedure above, i.e.: the refractory inorganic oxide, rare earth oxides (A), transition metal oxides (B) and optionally the oxides of alkaline-earth elements (D), as well as precious metals (C). The weight of the monolithic substrate made of ceramic or metal is not taken into account in the expression of the contents per unit of mass of each of the components of this catalytic phase.

According to the practices of one skilled in the art, the amounts of precious metal present in the catalyst will generally be expressed in grams per liter of substrate. The contents per unit of mass of the various elements that constitute the catalytic phase (or active phase) are presented in Table I.

Example 1

(Invention)

250 g of bonding alumina (boehmite) in powder form is dispersed in 2500 cm$^3$ of distilled water that contains the equivalent of 18 g of nitric acid. Then, 850 g of alumina batch (γ-alumina) with a specific surface area of 110 m$^2$/g is introduced.

This suspension is ground so that the average grain size of the solid particles is less than 10 microns.

A 0.904 liter ceramic monolith, sold by the Corning company and having a honeycomb structure with a density of 62 cells per cm$^2$, is coated with this suspension. To carry out this operation, the substrate is submerged in the medium for several seconds, shaken and blown to eliminate excess product that obstructs the channels. The substrate, covered by the material film, is dried and then calcined at 600° C. to attach the coating (or "wash coat") to the substrate.

After a second coating operation and heat treatment under air at 900° C. for 10 hours, the alumina "wash coat" content is 120 g per liter of substrate, and its specific surface area is 85 m$^2$/g.

The alumina-coated monolith is then saturated with a lanthanum nitrate solution then dried at 120° C. for 2 hours and calcined at 1000° C. for 6 hours. The lanthanum content that is expressed in oxide ($La_2O_3$) relative to the final layer of the active phase is 8% by weight.

The analysis by x-ray diffraction of a "wash coat" sample that is removed by scraping the monolith demonstrates the presence of lanthanum aluminate.

This monolith is then saturated with an equimolecular aqueous solution of lanthanum nitrate and of cobalt nitrate so that the contents per unit of mass of lanthanum oxide ($La_2O_3$) and of ($Co_2O_3$) relative to the final active phase layer are, respectively, 19.5% and 5.9% by weight.

After calcination at 900° C. for 4 hours, the presence of perovskite $LaCoO_3$ is not detected during x-ray diffraction analysis of a wash coat sample.

This coated monolith is finally saturated with an aqueous solution of dinitroso-diamino platinum so that the platinum content in the final catalyst is 1 g per liter of substrate. The final heat treatment is carried out under air at 500° C. for 2 hours.

Example 2

(Comparative)

The preparation of the catalyst of Example 1 is reproduced, with the exception that the stages of saturation of the solutions that contain lanthanum and cobalt nitrates are eliminated.

Example 3

(Comparative)

The preparation of the catalyst of Example 1 is reproduced, with the exception that the stage of saturation of the mixed solution that contains the lanthanum and cobalt nitrates is replaced by a single saturation with a solution that contains only lanthanum nitrate.

Example 4

(Comparative)

The preparation of the catalyst of Example 1 is reproduced, with the exception that the stages of saturation of the solutions that contain lanthanum and cobalt nitrates are eliminated and replaced by a single saturation of a cobalt nitrate solution.

Example 5

(Invention)

The preparation of the catalyst of Example 1 is reproduced, with the exceptions that:
  the first saturation is carried out with a solution that contains lanthanum nitrate and praseodymium nitrate so that the content of rare earth oxides after this first operation is always 8% by weight and so that in the final layer the praseodymium oxide content is 4% by weight; and
  the second stage of saturation is carried out by replacing 20% by weight of the cobalt nitrate with the same amount of copper nitrate.

The other operations, calcination and saturation of the platinum precursor are unchanged.

Example 6

(Invention)

The preparation of Example 1 is reproduced, with the exceptions that:
  the amount of lanthanum oxide that is introduced in first stage (b) of saturation of rare earths corresponds to a content of 9.5% by weight of lanthanum oxide relative to the content of refractory oxide,
  the calcination temperature (stage c) after the stage of saturation of the rare earth is 1050° C., and the duration of the heat treatment is 8 hours,
  second saturation stage (d) is carried out starting with a nitric solution that contains a mixture of rare earths (lanthanum and neodymium) and transition metals (cobalt and nickel) so that the ratios per unit of mass, in the final catalysts, $La_2O_3/Nd_2O_3$ and $Co_2O_3/NiO$ are, respectively, 5 and 4, and so that the contents per unit of mass of rare earth oxides and of transition metal oxides are, respectively, 18.5% and 3.5% by weight,
  the saturation of the platinum solution in stage (f) is replaced by the saturation of a hydrochloric solution that contains platinum and palladium at an atomic ratio of Pt/Pd equal to 5.

The operating conditions of the other stages are unchanged.

Example 7

(Invention)

On a stacked-type metal monolith, with zig-zag channels, from the ROSI company, is coated an alumina suspension that is identical to that of Example 1 but that additionally contains a ZSM5 type zeolite in an Si/Al ratio of 25 with, for this suspension, an alumina/zeolite ratio per unit of mass of 5 and that replaces the alumina bonding material with a silica sol.

After the monolith is coated and calcined at 800° C., a mixed solution of lanthanum nitrate and samarium nitrate is saturated with an La/Sm atomic ratio of 2 and a rare earth oxide content of 6% by weight relative to the sum of alumina plus rare earth oxides.

After calcination at 850° C. for 4 hours, the monolith is again saturated with a mixed solution that contains lanthanum nitrate, cobalt nitrate, and strontium nitrate in an atomic ratio of Co/Sr=2.5 and Co/La=1.67. The calcination stage is carried out at 900° C. for 2 hours.

The addition of precious metal is carried out as described in Example 1.

Example 8

(Invention)

An alumina suspension that is identical to that of Example 1 is coated on a metal monolith with a fibrillary structure with radial gas circulation.

On this monolith, which is calcined at 700° C., a lanthanum nitrate solution is saturated so that the lanthanum oxide content is 4% by weight relative to the final active phase. Another calcination stage under air is carried out at 750° C. for 10 hours.

A mixed nitric solution of lanthanum, cobalt, and manganese is then saturated so that the La/Co and La/Mn atomic ratios are equal, respectively, to 1.6 and 2.86. The lanthanum oxide content in the final catalytic phase is 18% by weight.

After calcination at 950° C. for 6 hours, the coated monolith is saturated with a mixed solution of rhodium nitrate and dinitroso-diamino platinum at a Pt/Rh atomic ratio=10, with a precious metal content of 2 g per liter of substrate.

For each of the catalysts described above, the weight and the composition per unit of mass of the active phase that is deposited on the ceramic or metal substrate (refractory inorganic oxides, rare earth oxides (A), elements that belong to the group of transition metals (B), precious metals (C) and optionally alkaline-earth metals (D)), are summarized in Table I.

TABLE I

Composition per unit of mass of the active phase of the catalyst
(oxides + metals - without substrate)
(Content per liter of substrate and percentage per unit of mass
in the catalytic phase)

| catalyst of the example | inorganic oxide | rare earth oxide | | | | alkaline-earth oxide | transition metal oxides | | | | precious metals | | |
|---|---|---|---|---|---|---|---|---|---|---|---|---|---|
| | | $La_2O_3$ | $Sm_2O_3$ | $Nd_2O_3$ | $Pr_6O_{11}$ | SrO | $Co_2O_3$ | CuO | $Mn_2O_3$ | NiO | Pt | Rh | Pd |
| 1 (inv.) (162.20 g/l) | 73.983 (120 g) | 19.5 (31.63) | | | | | 5.9 (9.57) | | | | 0.616 (1.0) | | |
| 2 (comp.) (121.0 g/l) | 99.173 120 | | | | | | | | | | 0.827 (1.0) | | |
| 3 (comp.) (150.31 g/l) | 79.835 (120) | 19.5 29.31 | | | | | | | | | 0.665 1.0 | | |
| 4 (comp.) (128.59 g/l) | 93.322 120 | | | | | | 5.9 7.59 | | | | 0.778 (1.0) | | |
| 5 (inv.) (162.20 g/l) | 73.983 (120) | 15.5 (25.14) | | | 4.0 (4.81) | | 4.72 (7.66) | 1.18 (1.91) | | | 0.616 (1.0) | | |
| 6 (inv.) (155.27 g/l) | 77.284 (120) | 15.5 (24.07) | | 4.0 (6.49) | | | 2.8 (4.35) | | | 0.7 (1.09) | 0.556 0.863 | | 0.060 (0.093 |
| 7 (inv.) (161.28 g/l) | 77.284 (120) | 9.89 (15.95) | 2.0 (3.23) | | | 4.34 7.0 | 8.742 (14.1) | | | | 0.620 (1.0) | | |
| 8 (inv.) (136.15 g/l) | 77.12 (105) | 18.0 (24.51) | | | | | 2.228 (3.03) | | 1.185 (1.61) | | 1.394 (1.898 | 0.075 (0.102 | |

Example 9

The catalysts prepared on ceramic substrates are tested in the laboratory in a micro-unit with a mixture of synthetic gas that contains the main families of compounds that are present in exhaust gas of a diesel engine. The operating conditions are as follows:

| volumetric flow rate (VVH) composition of the mixture: | 10 000 h$^{-1}$ |
|---|---|
| $NO_x$ | 600 ppm |
| hydrocarbons | 6000 ppmC (methane equivalent) |
| $O_2$ | 5% |
| $CO_2$ | 10% |
| CO | 500 ppm |
| $H_2O$ | 10% |
| $SO_2$ | 20 ppm |
| $N_2$ | addition to 100% |
| temperature (5° C./min.) | increase from 150 to 500° C. |

Analysis of the main components is carried out continuously at the output of the reactor by analyzers with infrared detection for carbon monoxide (CO) and nitrogen protoxide ($N_2O$), by flame ionization for hydrocarbons (HC), and by chemiluminescence for nitrogen oxides (NO and $NO_2$).

These results of analysis make it possible to determine the changes in the conversion of nitrogen oxides, in the selectivity of nitrogen protoxide, and in nitrogen output depending on the change in reaction temperature.

The formulas of calculation for these three parameters (expressed in %) are as follows:

$NO_x$ conversion: C=100×($NO_x$ input-$NO_x$ output)/$NO_x$ input $N_2O$ selectivity: S=100×(2×N2O formed)/$NO_x$ lost $N_2$ output: R=C×(100−S)/100

Table II below summarizes the values of the temperatures and the three parameters that are calculated above for the test conditions that correspond to the lowest emissions of $NO_x$ at the output of the catalyst (greatest conversions).

TABLE II

Catalytic Tests in Micro-Unit

| Catalyst of the example | Composition | Max. $NO_x$ conversion (%) | N20 selectivity (%) | $N_2$ output (%) | Max. temperature conversion (°C.) |
|---|---|---|---|---|---|
| 1 (inv.) | $Al_2O_3$ La—Co Pt | 85 | 21 | 67.1 | 280 |
| 2 (comp.) | $Al_2O_3$ Pt | 66 | 50 | 33 | 271 |
| 3 (comp.) | $Al_2O_3$ La Pt | 55 | 45 | 30.2 | 285 |
| 4 (comp.) | $Al_2O_3$ Co Pt | 67 | 45 | 36.8 | 270 |
| 5 (inv.) | $Al_2O_3$ La—Pr— Co—Cu Pt | 88 | 31 | 60.7 | 263 |
| 6 (inv.) | $Al_2O_3$ La—Nd— Co—Ni Pt—Pd | 76 | 34 | 50.2 | 285 |

It is noted that the lowest temperatures to achieve these maxima are not always associated with the catalysts of the invention. The objective of the elimination of the nitrogen oxides in an exhaust gas, however, is to reduce them to inert molecular nitrogen ($N_2$), and not to transform them into nitrogen protoxide ($N_2O$), which is an undesirable polluting by-product.

Consequently, the catalysts of the invention therefore provide the best performance for the reaction of reduction of all the oxidized compounds of nitrogen to molecular nitrogen.

Example 10

The catalysts prepared on metal substrates were tested on an engine bed equipped with a diesel engine of average capacity (1.9 liters). The engine speed of the vehicle is kept constant (2300 t/mn). To increase the temperature of the exhaust gases, the load of the engine is gradually increased by a hydraulic brake.

Under these conditions, the emissions of unburned or partially oxidized nitrogen oxides and hydrocarbons vary little: the contents are respectively from 200 to 300 ppm of $NO_x$ and 50 to 150 ppm C (methane equivalent).

To ensure that a significant portion of nitrogen oxides can be eliminated by catalytic reduction, an addition of gas oil is injected upstream from the catalyst so that its concentration in the exhaust gas before catalysis is equivalent to 3000 ppmC (methane equivalent). The volumetric flow rate of the reagents in the catalyst is kept almost constant and equal to 30 000 $h^{-1}$, and the temperature of the gas at the input of the catalyst varies between 250° and 500° C.

Table III summarizes the performance levels that are obtained with these catalysts, in particular the maximum conversion rates of the nitrogen oxides and the temperatures for which they were obtained.

TABLE III

Catalytic Tests on a Diesel Engine (Engine Bed)

| Catalyst of the example | Composition | Substrate | Max. $NO_x$ conversion (%) | Max. conversion temperature (°C.) |
|---|---|---|---|---|
| 1 | $Al_2O_3$ La—Co Pt | ceramic | 52 | 254 |
| 3 (comp.) | $Al_2O_3$ La Pt | ceramic | 32 | 265 |
| 7 | $Al_2O_3$ — ZSM5 $SiO_2$ La—Sm—Sr—Co Pt | metal stacked | 47 | 242 |
| 8 | $Al_2O_3$ La—Co—Mn Pt—Rh | metal fibers | 45 | 265 |

It is noted that the conversion rates of nitrogen oxides in the diesel engine exhaust gases in the catalysts of the invention and under the operating conditions defined above are greater than 45% for temperatures between 240° and 265° C. Under the same conditions, a catalyst of the prior art converts only about 30% of $NO_x$ at a comparable temperature.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A catalyst that is active and selective for the reduction of nitrogen oxides to molecular nitrogen in a superstoichiometric medium of oxidizing compounds, comprising:

at least one refractory inorganic oxide containing alumina;

at least one rare earth element (A);

at least one group VIB, VIIB, VIII or IB transition metal element (B);

at least one precious metal element (C) which is platinum, rhodium, ruthenium, iridium, or osmium;

and optionally at least one group IIa alkaline-earth element (D);

at least one portion of element (A) being combined with a portion of alumina to form on the surface of the latter a microlayer of rare earth aluminate.

2. A catalyst according to claim 1, having an active phase of a composition, expressed in percent by weight relative to a product that is calcined at 1000° C. for 4 hours, is as follows:

from 30 to 98.45% of at least one refractory inorganic oxide, from 1 to 30% of at least one rare earth element (A), expressed in oxide form, from 0.5 to 20% of at least one group VIB, VIIB, VIII and IB of transition metal element (B), expressed in oxide form, from 0.05 to 5% of at least one precious metal element (C); and from 0 to 15% of at least one group IIA alkaline-earth element (D), expressed in oxide form.

3. A catalyst according to claim 1, wherein the refractory inorganic oxide is alumina, silica, silica-alumina, a zeolite, titanium oxide, zirconium oxide, a mixed oxide, a solid solution of at least two of the above-mentioned oxides, or a mixture of at least two of these compounds.

4. A catalyst according to claim 3, wherein the refractory inorganic oxide is β-alumina, δ-alumina, γ-alumina, θ-alumina or χ-alumina, a mixture of at least two of these aluminas.

5. A catalyst according to one of claim 1, wherein element (A) is lanthanum, and at least one of neodymium, praseodymium, samarium or gadolinium.

6. A catalyst according to claim 5, wherein element (A) is lanthanum.

7. A catalyst according to claim 1, wherein element (B) is copper, nickel, cobalt, iron, manganese, chromium, molybdenum or a mixture of at least two thereof.

8. A catalyst according to claim 7, wherein element (B) is copper, nickel, cobalt, manganese or a mixture of at least two thereof.

9. A catalyst according to claim 1, wherein element (C) is platinum.

10. A catalyst according to claim 1, wherein element (C) contains palladium of up to 20% by weight relative to the precious metals.

11. A catalyst according to claim 1, wherein element (D) is magnesium, calcium, barium, strontium or a mixture of at least two thereof.

12. A catalyst according to claim 1, wherein the composition per unit of mass of the catalytic phase, expressed relative to a product calcined at 1000° C., is:

from 52 to 93.9% of at least one refractory inorganic oxide;

from 5 to 20% of at least one element (A), expressed in oxide form;

from 1 to 15% of at least one element (B), expressed in oxide form;

from 0.1 to 3% of at least one metal (C); and from 0 to 10% of at least one element (D), expressed in oxide form.

13. A catalyst according to claim 1, wherein the weight of the alumina relative to the weight of refractory inorganic oxide constituting an active phase of the catalyst is between 50 and 100%.

14. A catalyst according to claim 1, wherein the atomic ratio between, on the one hand, the sum of atoms of rare earths (A) and optionally the atoms of alkaline-earth elements (D) and, on the other hand, the number of atoms of transition metals (B) is between 0.1 and 10 and preferably between 0.5 and 5.

15. A catalyst according to claim 1, containing no perovskite composite oxide detectable by X-ray diffraction.

16. A catalyst according to claim 1, having a catalytic phase comes in the form of balls, extrudates, or pellets.

17. A catalyst according to claim 1, containing a catalytic phase supported by a monolithic substrate.

18. A catalyst according to claim 17, wherein said monolithic substrate is made of ceramic or of metal.

19. A catalyst according to claim 18, wherein the substrate is metal and has a structure that is wound or stacked with straight or zig-zag channels, or has a fibrillary structure.

20. A catalyst according to claim 17, wherein 20 to 300 g of the catalytic phase is deposited or prepared on the monolithic substrate per liter of substrate.

21. A process for the preparation of a catalyst according to claim 1, wherein the preparation of the catalytic phase comprises:

a) calcining under air of the refractory inorganic oxide at between 500° and 1100° C., b) saturating of this refractory inorganic oxide with at least one portion of at least one precursor salt of at least one rare earth oxide (A), c) drying and then calcining under air, of the inorganic oxide that is saturated with the precursors of rare earth oxides (A) at a temperature and for a time effective to convert at least one portion of element (A) and alumina to a microlayer of rare earth aluminate.

d) saturating of modified refractory oxide of (c), with a solution that contains any remainder of at least one precursor salt of at least one rare earth oxide (A), plus at least one precursor salt of at least one element of transition metal (B), e) drying and calcining under air of the refractory oxide in stage (d), at a temperature of between 650° and 900° C., f) saturating on the product that comes from calcination stage (e) of at least one precursor compound of at least one precious metal (C), g) drying and heat treating of the inorganic oxide saturated with the precious metal precursor in stage (f), at a temperature of between 300° and 900° C., and h) optionally adding an alkaline-earth element (D) by saturation with at least one precursor of at least one element that belongs to group IIB of the periodic table simultaneously with, before or after saturation in (b) or (d).

22. A process according to claim 21, wherein the specific surface area of the alumina after calcination stage (a) is between 10 and 150 m²/g.

23. A process according to claim 21, further comprising coating an active phase that is prepared therein on a monolithic substrate made of ceramic or of metal.

24. A process according to claim 21, wherein an active phase is directly prepared on a monolithic substrate made of ceramic or of metal.

25. A catalyst according to claim 7, wherein element (B) is copper and at least one of nickel, cobalt, or manganese.

26. A catalyst that is active and selective for the reduction of nitrogen oxides to molecular nitrogen in a superstoichiometric medium of oxidizing compounds, comprising:

at least one refractory inorganic oxide containing alumina;

at least one rare earth element (A) which is lanthanum and optionally at least one of neodymium, praseodymium, samarium or gadolinium;

at least one group VIB, VIIB, VIII or IB transition metal element (B);

at least one precious metal element (C) which is platinum, rhodium, ruthenium, iridium, or osmium;

and optionally at least one group IIa alkaline-earth element (D);

at least one portion of element (A) being combined with a portion of alumina to form on the surface of the latter a microlayer of rare earth aluminate.

27. A catalyst according to claim 26, wherein element (B) is copper and at least one of nickel, cobalt, or manganese.

28. A catalyst according to claim 1, comprising at least one group VIB, VIIB, VIII or IB transition metal element (B) and different therefrom at least one precious metal element (C) which is platinum, rhodium, ruthenium, iridium or osmium.

29. A catalyst according to claim 26, comprising at least one group VIB, VIIB, VIII or IB transition metal element (B) and different therefrom at least one precious metal element (C) which is platinum, rhodium, ruthenium, iridium or osmium.

30. A process according to claim 21, wherein calcining in (c) is conducted at 700° to 1100° C.

31. A process according to claim 21, wherein calcining in (c) is conducted at 1000° to 1100° C.

32. A catalyst prepared by the process of claim 21.

33. A catalyst prepared by the process of claim 30.

34. A catalyst prepared by the process of claim 31.

* * * * *